United States Patent [19]

Melchior et al.

[11] Patent Number: 5,203,288
[45] Date of Patent: Apr. 20, 1993

[54] TWO-STROKE INTERNAL COMBUSTION ENGINES WITH A COMPRESSION-IGNITION OF DIESEL TYPE

[75] Inventors: Jean Melchior; Thierry Andre, both of Paris; Henri B. Edelmann, Sevres, all of France

[73] Assignee: S.N.C. Melchior Technologie, Paris, France

[21] Appl. No.: 768,213
[22] PCT Filed: Jan. 30, 1991
[86] PCT No.: PCT/FR91/00056
 § 371 Date: Oct. 11, 1991
 § 102(e) Date: Oct. 11, 1991
[87] PCT Pub. No.: WO91/12419
 PCT Pub. Date: Aug. 22, 1991

[30] Foreign Application Priority Data

Feb. 13, 1990 [FR] France .................. 90 01683

[51] Int. Cl.⁵ .................................. F02B 75/02
[52] U.S. Cl. .......................... 123/65 VD; 123/432
[58] Field of Search ........... 123/65 VD, 432, 308, 123/257

[56] References Cited

U.S. PATENT DOCUMENTS

| | | | |
|---|---|---|---|
| 4,162,662 | 7/1979 | Melchior | 123/65 VD |
| 4,616,605 | 10/1986 | Kline | 123/65 VD |
| 4,854,280 | 8/1989 | Melchior | 123/65 VD |
| 4,945,867 | 8/1990 | Tanahashi et al. | 123/65 VD |
| 4,995,348 | 2/1991 | Melchior | 123/65 VD |
| 5,014,663 | 5/1991 | Melchior | 123/65 VD |
| 5,062,395 | 11/1991 | Tateno | 123/65 VD |

FOREIGN PATENT DOCUMENTS

| | | | |
|---|---|---|---|
| 3143402 | 5/1983 | Fed. Rep. of Germany | 123/65 VD |
| 949642 | 9/1949 | France | |

Primary Examiner—David A. Okonsky
Attorney, Agent, or Firm—Larson and Taylor

[57] ABSTRACT

In a two-stroke internal combustion engine with a compression-ignition of Diesel type, the exhaust valve or valves (10) are so arranged as to allow flow on at least the major part of their periphery; the piston (3) cooperates with the ceiling of the cylinder head (6) in such manner as to leave, in the vicinity of top dead center, only the required operational clearance between the piston (3) and the part of the ceiling of the cylinder head in which the exhaust valve or valves (10) is or are placed; and a cylindrical recess (14) in which is placed the head (13) of the inlet valve or valves (8) and into which a fuel injector discharges, is arranged in such manner as to constitute practically alone the combustion chamber (7) when the piston (3) is in the vicinity of top dead center.

7 Claims, 5 Drawing Sheets

TWO-STROKE INTERNAL COMBUSTION ENGINES WITH A COMPRESSION-IGNITION OF DIESEL TYPE

The invention concerns an internal combustion engine of the two-stroke type with a compression-ignition of Diesel type, which comprises at least one cylinder devoid of lateral ports and at least one piston undergoing a reciprocating motion in this cylinder and delimiting with the latter and with a cylinder head a combustion chamber of variable volume, said cylinder head carrying at least one inlet valve and at least one exhaust valve respectively adapted to an air inlet pipe and to an exhaust pipe for the exhaust gas, the axis of the or each inlet valve making with the axis of the cylinder an angle approximately between 30° and 60° so that the stem of this valve is at a greater distance away from the axis of the cylinder than the head of the valve and this head being placed at the inner end of an at least partly cylindrical recess of the cylinder head into which recess a fuel injector discharges and whose depth increases in a regular manner from the periphery toward the center of the combustion chamber without constituting a constriction toward the latter so that, when this valve is open, it allows a flow on only about one half of its periphery in directing the air toward the piston during the scavenging along and in the vicinity of the generatrix of the cylinder which is the most remote from the exhaust valve or valves, the engine being provided with means for starting it up and operating it at low power.

The invention therefore excludes engines having a controlled ignition since their combustion chambers are fed by a homogeneous mixture of air and fuel preformed in a carburettor or by injection in the inlet pipe during the filling stage of the engine, so that there is no problem of the homogenization of the mixture in the combustion chambers.

An engine of the type defined in the preamble is described in U.S. Pat. No. 4,162,662 and the means for starting it up and operating it at low power are described in particular in U.S. Pat. No. 4,995,348.

An object of the invention is to achieve a satisfactory compromise between the following two requirements which will be studied in succession hereinafter:

a) achieve a good scavenging when the piston is in the vicinity of the bottom dead center (BDC) and the inlet and outlet valves are simultaneously opened;

b) permit, by perfecting in this respect the engine described in the aforementioned U.S. Pat. No. 4,162,662, a rapid combustion with high efficiency when the piston is in the vicinity of the top dead center (TDC) and the inlet and exhaust valves are simultaneously closed.

As concerns first of all the scavenging, the cylinder head must be as permeable as possible, i.e. it must allow through the maximum amount of fresh air for a given pressure difference between the inlet and the exhaust, and the efficiency of the utilization of the air (designated by "trapping efficiency", i.e. the ratio between the mass of fresh air retained by the working chamber and the mass of fresh air passing through the inlet valve) must be as high as possible. When the two-stroke engine is supercharged by a turbo-compressor unit whose turbine is driven by the exhaust gases, satisfying the two criteria defined hereinbefore is more particularly advantageous. Indeed, the energy balance of the supercharging turbine is then improved, which permits reducing the pressure difference between the inlet and the exhaust of the engine and consequently improving the air/fuel ratio by permitting an improved combustion. Indeed, by reducing the aforementioned pressure difference, 1—the dilution of the exhaust gases fed to the turbine is reduced, which permits increasing the pressure of the supercharging air (greater energy on the upstream side of the turbine);

2—the expansion rate of the turbine is increased, which increases the supercharging pressure and therefore the pressure of the air in the cylinder;

3—the pressure in the cylinder (which is closer to the supercharging pressure since the inlet-cylinder-exhaust pressure difference is decreased) is increased.

As concerns now the combustion, the shape of the combustion chamber must be simple so that not only is the manufacture of this chamber cheaper, but the fuel sprayed by the injector may reach the whole of the chamber (in avoiding the dark zones and the pockets which are difficult to irrigate) and it may be desirable to facilitate the moving of the air by the displacement of the piston cooperating with the ceiling of the cylinder head. The "pinching" (or "squish") or transverse rush of the charge of air when the piston reaches the vicinity of the TDC, will create intense movements of air whose direction is reversed upon the descent of the piston, these movements of air favoring a homogeneous mixing of the latter with the fuel.

It is known that two-stroke engines are generally more thermally charged than four-stroke engines since:

a driving cycle per revolution is produced therein;

the proportion of the exhaust gases put back into circulation is large, which increases the temperature of the gases trapped in the combustion chamber upon the simultaneous closure of the inlet and exhaust valves.

The thermal exchange between the gases and the wall of the combustion chamber is therefore higher in a two-stroke engine than in a four-stroke engine. As the part of the engine which is the most difficult to cool is the piston, piston structures are therefore sought which are as flat as possible, which minimizes the surface area of the passage of the heat toward the piston.

In conclusion, in order to achieve the compromise defined hereinbefore, combustion chamber shapes are sought which permit obtaining in a simple manner:

high permeability;

a minimum short-circuit (or direct passage of the fresh air from the inlet to the exhaust);

an easy irrigability by the sprayed fuel;

a minimum surface area of thermal exchange toward the piston; and incidentally, a possibility of obtaining high volumetric ratios.

To this end, the engine according to the invention is essentially characterized in that:

the exhaust valve or valves are so arranged as to allow flow on at least the major part of their periphery;

the piston cooperates with the ceiling of the cylinder head so as to leave, in the vicinity of the top dead center, only the required operational clearance between the piston and the part of the ceiling of the cylinder head in which the exhaust valve or valves is or are placed; and said recess is so arranged as to constitute practically alone the combustion chamber when the piston is in the vicinity of the top dead center.

There is obtained in this way an internal combustion engine which attains the object of the invention.

As is clear from the foregoing, the problem of the scavenging, i.e. the maximum replacement of the combustion gases by the fresh air inside the cylinder with minimum short-circuiting of this air either directly, or indirectly with said combustion gases, is solved in a satisfactory manner in U.S. Pat. No. 4,162,662 by causing the inlet valve to allow flow on about one half of its periphery (even if this involves compensating for the resulting decrease in its flow section by doubling its rise) and by directing the flow of air toward the piston along the generatrix of the cylinder which is the most remote from the exhaust valve. On the other hand, the engine described in this document does not lend itself to the organization of the movements of air and swirlings, preferably of increasing velocity, brought about by the movement of the piston toward the cylinder head.

Note that French Patent No. 949,642 describes an engine which differs from the preamble of claim 1 but which largely conforms to its characterizing part. This document shows an arrangement where the swirlings produced in the cylinder during the intake are conserved in being amplified by the movement of the piston. On the other hand, the construction described in this document does not preclude large short-circuits between the inlet and the exhaust, direct short-circuits or indirect short-circuits resulting from an intense mixture of the air introduced into the cylinder and the gases flowing through the exhaust, and therefore presents poor scavenging characteristics.

The invention has for effect to combine by a very simple modification the advantages of the constructions according to U.S. Pat. No. 4,162,662 and French Patent No. 949,642 (excellent characteristics of scavenging and organization of movements of air favouring the combustion) while eliminating their individual drawbacks, whereas one skilled in the art would have, on the contrary, feared associating these drawbacks.

Preferably, the engine is supercharged by a turbocompressor unit whose turbine is driven by the exhaust gases.

According to a judicious construction, the squish surface between the piston and the part of the ceiling of the cylinder head outside the recess represents between about one half and ¾ of the transverse area of the piston, which contributes to increasing the expulsion of air at the TDC.

Said angle between the axis of the inlet valve or valves and the axis of the cylinder is preferably equal to about 40° so as to clear as far as possible the section of passage toward said generatrix.

Further, the relative rise (i.e. with respect to the diameter of the valve head) of the or each inlet valve is preferably approximately double that of the or each exhaust valve, which permits compensating for the fact that the or each inlet valve allows a flow only on about one half of its periphery.

According to an advantageous construction, the engine comprises a single exhaust valve whose axis is preferably parallel to the axis of the cylinder or slightly inclined to the last-mentioned axis, and two inlet valves placed at the inner end of the same partly cylindrical recess.

The invention will now be described in more detail with the aid of embodiments represented in the accompanying drawings.

FIG. 1 is a diagram showing the principal elements of the engine.

FIGS. 2 and 3 of these drawings show in axial section the essential elements of an engine arranged in accordance with a first embodiment, the piston of which is respectively in its bottom dead center and top dead center positions.

Figure 2:
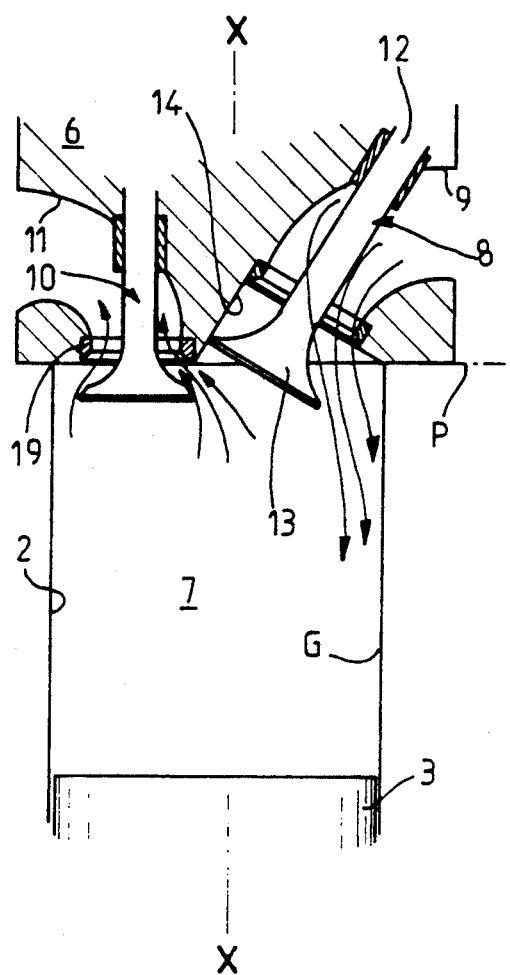
Figure 3:
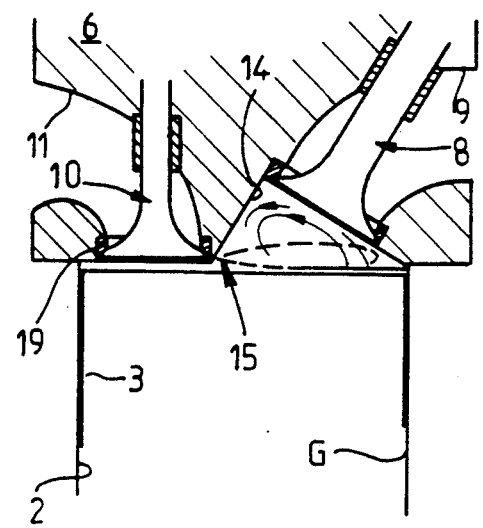
Figure 9:
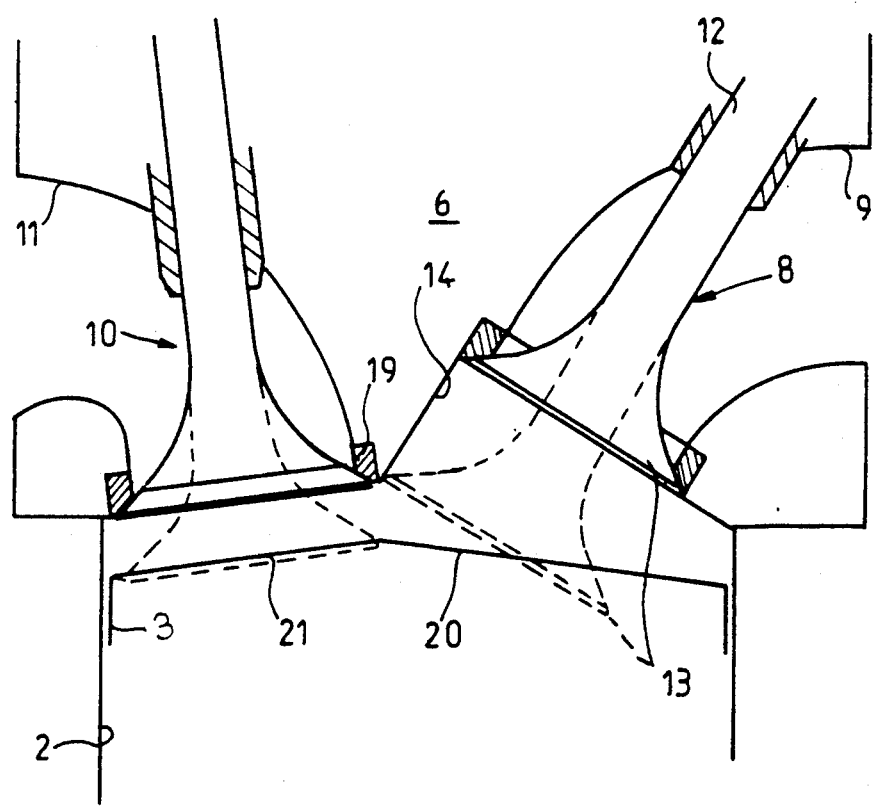

FIG. 9 lastly shows a variant of FIGS. 2 and 3.

Figure 1:
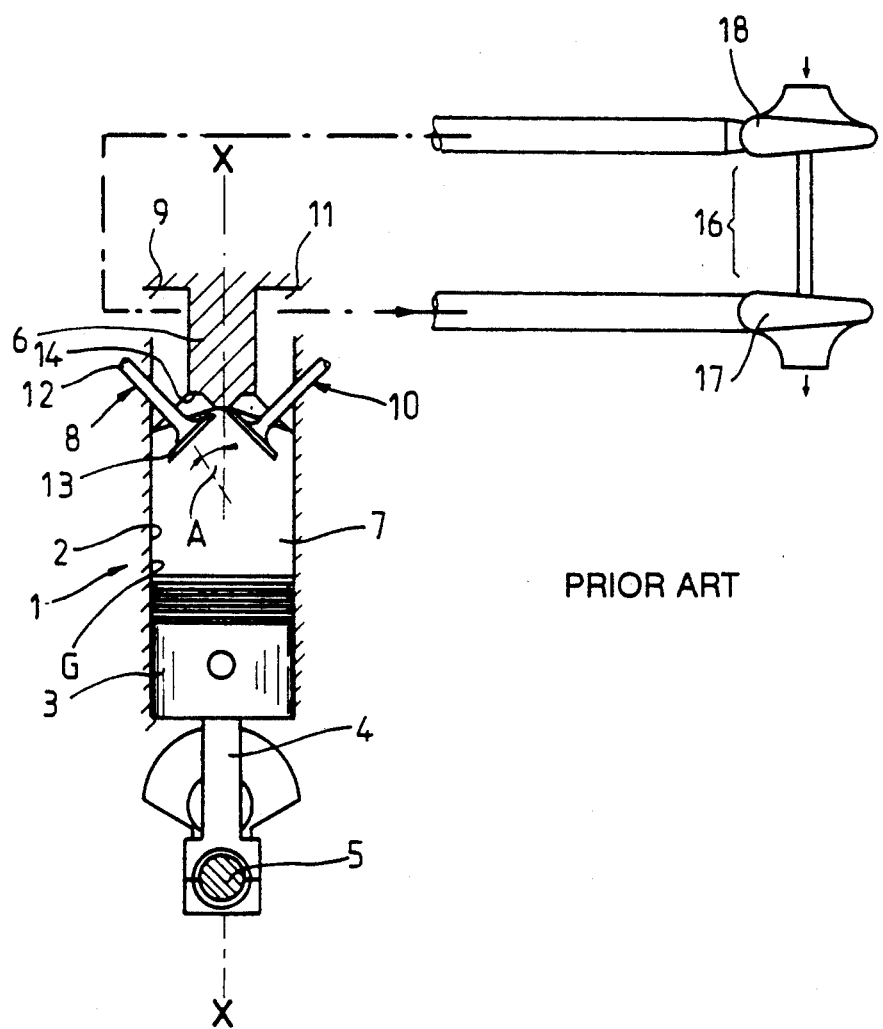

As shown in FIG. 1 which represents a known engine U.S. Pat. No. 4,162,662, the invention concerns a two-stroke internal combustion engine 1, with a compression-ignition of Diesel type, which comprises at least one cylinder 2 devoid of lateral ports and at least one piston 3 undergoing a reciprocating motion in this cylinder 2 and coupled by a connecting rod 4 to a crankshaft 5. The piston 3 delimits with the cylinder 2 and a cylinder head 6 a variable-volume combustion chamber 7. The cylinder head 6 carries at least one inlet valve 8 adapted to an air inlet pipe 9 and at least one exhaust valve 10 adapted to an exhaust pipe 11. Note that the exhaust valve 10 is represented in FIG. 1 in a known disposition and not in accordance with the invention. In the known manner, the reciprocating motions of the inlet valve 8 and exhaust valve 10 are synchronized with the rotational motions of the crankshaft 5.

The axis of the or each inlet valve 8 makes with the axis X—X of the cylinder 2, an angle A approximately between 30° and 60° in such manner that the stem 12 of this valve 8 is at a greater distance from the axis X—X of the cylinder 2 than the head 13 of said valve 8. This head 13 is placed at the inner end of an at least partly cylindrical recess 14 of the cylinder head 6 into which discharges a fuel injector, not shown in FIG. 1 but designated by 15 in some of the following Figures. The depth of the recess 14 increases in a regular manner from the periphery toward the center of the combustion chamber 7 without constituting a constriction toward this chamber 7 so that, when the valve 8 is open, it only allows a flow on about one half of its periphery, i.e. in the left half in FIG. 1, in directing the air toward the piston 3 along and in the vicinity of the generatrix G of the cylinder 2 which is the most remote from the exhaust valve or valves 10. In other words, owing to the inclination of the valve 8 and the shape and the arrangement of the recess 14, about one half of the head 13 of the valve 8 (left half in FIG. 2) is surrounded, with a small clearance, by the surface of the recess 14, which prevents the air from passing around this half while the other half (the right half in FIG. 2) of the head 13 emerges from the recess 14 and penetrates the combustion chamber 7 when the piston 3 is remote from its TDC and the valve 8 is open, which permits the air to pass around this latter half, as diagrammatically represented by the arrows in FIG. 2.

The engine is equipped with means for starting it up and operating it at low power. As mentioned before, such means are known and need not be described here.

Preferably but not necessarily, the engine 1 is supercharged by a turbo-compressor unit 16 constituted by a turbine 17 driven by the exhaust gases it receives from the pipe 11, and a compressor 18 mechanically driven by the turbine 17 and delivering air into the pipe 9.

Figure 4:
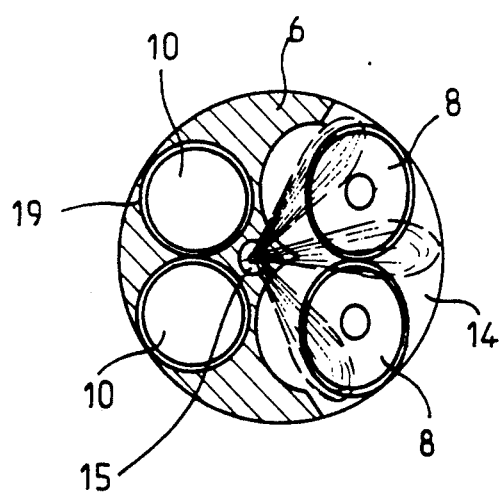
FIG. 4 represents the cylinder head of FIG. 3 seen from below.

According to the invention and according to the embodiment which is shown by way of example in FIGS. 2 to 4 and possesses two inlet valves 8 and two exhaust valves 10, the exhaust valves 10 are so arranged as to discharge (i.e. allow through the exhaust gases from the combustion chamber 7 to the exhaust pipe 11) on at least the major part of their periphery, as diagramatically represented by the arrows in FIG. 2.

In other words and in contrast to what is represented in FIG. 1, each exhaust valve 10 does not cooperate with a recess similar to the recess 14 but with a seat 19 which is flush with the ceiling of the cylinder head 6 on its periphery. The ceiling of the cylinder head is intended to mean the surface of the cylinder head 6 which contributes in the delimitation of the combustion chamber 7.

Further, the piston 3 cooperates with the ceiling of the cylinder head 6 in such manner as to leave, in the vicinity of the TDC and as represented in FIG. 3, only the required operational clearance between the piston 3 and the part of the ceiling of the cylinder head in which the exhaust valves 10 are placed.

Lastly, the recess 14 is arranged to constitute practically alone the combustion chamber 7 when the piston 3 is in the vicinity of the TDC, as shown in FIG. 3.

Generally, the top of the piston 3 is flat, as shown in FIG. 2, and the part of the cylinder head ceiling in which the exhaust valves 10 are placed is also flat and placed in a plane P perpendicular to the axis X—X of the cylinder 2. However, and as shown in FIG. 9, the ceiling of the piston 3 could have a roof shape, i.e. terminate in two planar surfaces 20 and 21 making an obtuse angle therebetween and respectively located in facing relation to the inlet valve or valves 8 and the exhaust valve or valves 10, the seat or seats 19 of the latter being disposed to be parallel to the facing surface 21. In any case, it is necessary to avoid, with the reservations explained hereinbefore, providing in the ceiling of the cylinder head and in the ceiling of the piston cavities which are open toward the combustion chamber 7, except for the recess 14 which enables the latter to constitute practically alone the combustion chamber 7 (as mentioned at the end of the preceding paragraph).

Preferably, the squish surface between the piston 3 and the part of the cylinder head ceiling outside the recess 14 represents between about one half and three quarters of the transverse surface area of the piston 3. This squish surface has been indicated by the cross-hatching in FIG. 4 and in FIGS. 6 and 8. In order to avoid complicating these Figures, the cross-hatchings which should cover the heads of the exhaust valves 10 have been omitted.

Figure 6:
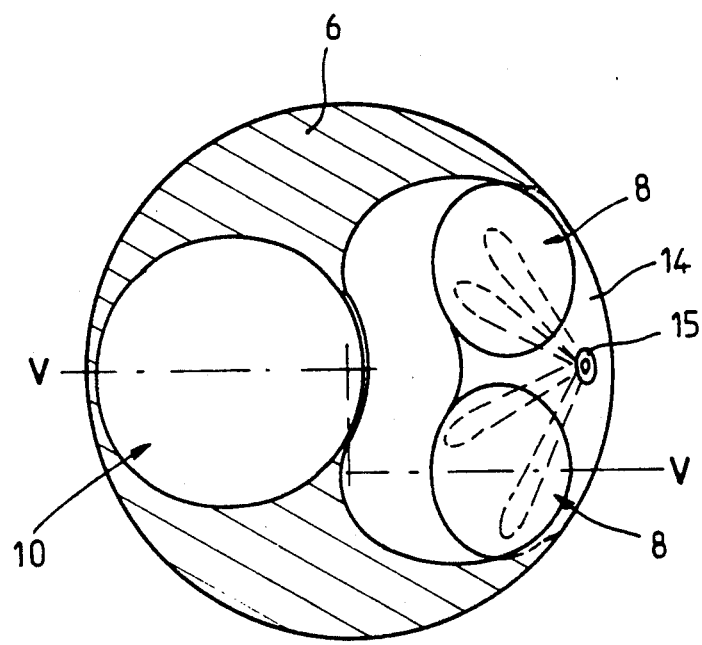
FIG. 6 represents the cylinder head of FIG. 5 seen from below.
Figure 5:
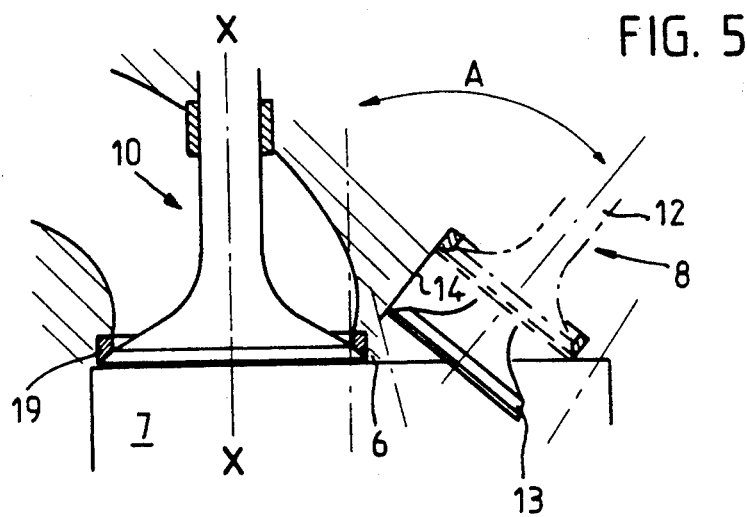
FIG. 5 shows, in section taken on line V—V of FIG. 6, the essential elements of an engine arranged in accordance with a second embodiment, represented in full lines and in dot-dash lines in the positions they respectively occupy when the piston is in its bottom dead center and top dead center positions.
Figure 7:
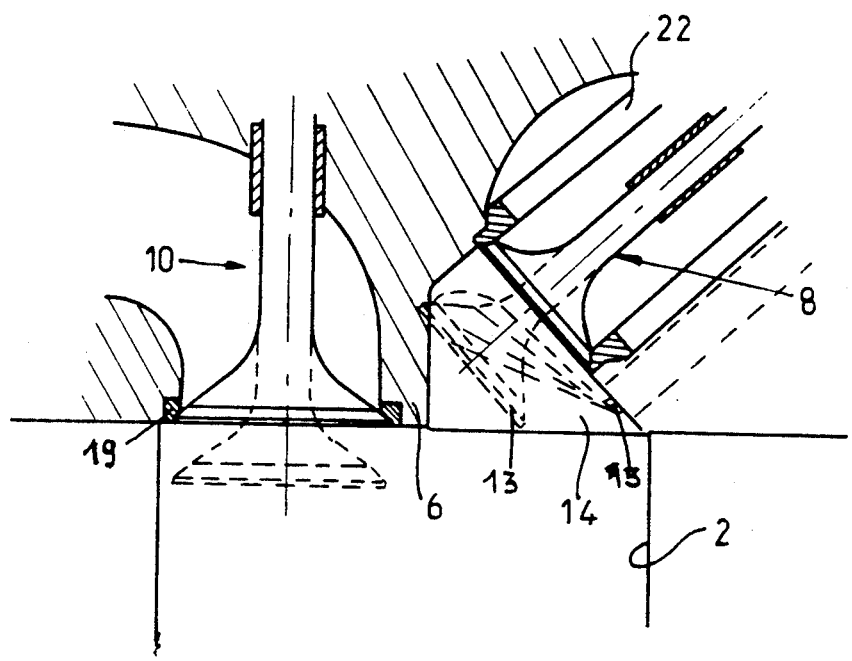
FIGS. 7 and 8 show, by views respectively similar to those of FIGS. 5 and 6, the essential elements of an engine arranged in accordance with a third embodiment.
Figure 8:
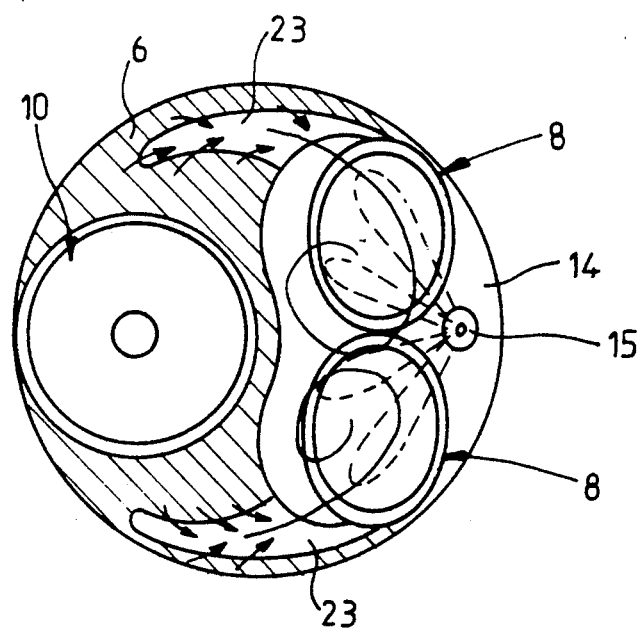

Although the embodiment of FIGS. 2 to 4 comprises two inlet valves 8 and two exhaust valves 10 it is preferred, as in the embodiment of FIGS. 5 and 6 and in that of FIGS. 7 and 8, to provide two inlet valves 8 and a single exhaust valve 10 whose axis is preferably parallel to the axis X—X of the cylinder 2.

The injector 15 is so arranged as to spray the fuel into the recess 14 as a continuous or discontinuous jet or sheet either toward the exterior (FIG. 4) or toward the interior (FIGS. 6 and 8) in an approximately radial direction.

As to the angle (designated by A in FIGS. 1 and 5) between the axis of the or each inlet valve 8 and the axis X—X of the cylinder 2, it is preferably chosen to be equal to about 40°. The choice of this angle is due to a compromise between various contradictory requirements, among which that of permitting the machining of the recess 14 and the mounting of the inlet valve or valves 8 in the cylinder head 6 through the ceiling of the latter. According to the embodiments of FIGS. 2 to 6, it can be seen that the head 13 of each inlet valve 8 encounters no obstacle to a downward displacement (assuming of course that the stem or rod 12 of this valve 8 has been released from its connection with the usual rocker or other means controlling its movement), which permits appreciating the fact that the requirement defined hereinbefore is satisfied.

As shown in FIG. 7, it is nonetheless possible to choose a larger angle A, but it is then necessary to associate with the inlet valves 8 a pocket system 22 which enables these valves 8 to be mounted and dismantled through the side of the cylinder head 6 remote from the combustion chamber 7, since the wall of the recess 14 then forms an insurmountable obstacle.

As shown in FIG. 8, it is advantageous to provide, in the part of the ceiling of the cylinder head 6 which is outside the recess 14, at least one groove 23 whose cross-section and/or depth decrease as one moves away from the recess 14. This groove 23 will advantageously have a semi-crescent shape.

Lastly, in order to take into account the fact that the exhaust valve or valves 10 only allow flow on a fraction of their perimeter while the inlet valve or valves 8 allow flow on at least the major part of their perimeter, it is advantageous to arrange that the relative rise of the or each inlet valve 8 be approximately double the relative rise of the or each exhaust valve 10.

There is in this way obtained an engine which operates in the following manner.

During the scavenging (see FIG. 2), the air flowing through the inlet valve or valves 8 is directed along the above-defined generatrix G or close to and parallel to this generatrix, which minimizes the risks of short-circuiting with the exhaust valve or valves 10.

During combustion (when the piston 3 approaches TDC as shown in FIG. 3), the space between the piston 3 and the "squish" part of the ceiling of the cylinder head (part covered by the cross-hatching in FIG. 4) diminishes in volume down to a quasi-zero value and the air enclosed in this space is violently expelled toward the recess 14 and creates therein swirling motions which homogenize the mixture of this air and the fuel previously sprayed by the injector 15, which ensures an optimum combustion.

The groove or grooves 23 of FIG. 8, which may moreover be employed in the other embodiments, intensify said swirling motions.

Although the description of the Figures has been limited to the case where the engine 1 has only a single cylinder 2, it is obvious that it is just as applicable to any number of cylinders 2. Likewise, although the description has been limited to the case where the ceiling of the piston 3 is flat and to the case where it is formed by two planar surfaces 20 and 21, it will be possible to provide the piston 3 with a shallow recess in facing relation to the recess 14 in the cylinder head 6.

We claim:

1. Two-stroke internal combustion engine with a compression-ignition of Diesel type, which comprises at least one cylinder devoid of lateral ports and at least one piston undergoing a reciprocating motion in this cylinder and delimiting with the cylinder and with a cylinder head a variable-volume combustion chamber, said cylinder head carrying at least one inlet valve and at least one exhaust valve respectively adapted to an air inlet pipe and to an exhaust pipe for exhaust gas, a longitudinal axis of the or each inlet valve making with a longitudinal axis of the cylinder an angle approximately between 30° and 60° so that a stem of this inlet valve is at a greater distance from the axis of the cylinder than an inlet valve head of the inlet valve, this inlet valve head being placed at an inner end of an at least partly cylindrical recess of the cylinder head into which recess a fuel injector discharges and where a depth of said recess increases in a regular manner from the periphery toward the center of the combustion chamber without constituting a constriction toward the combustion chamber so that, when this inlet valve is open, the inlet valve allows flow only on about one half of a periphery thereof in directing the air toward the piston, during the scavenging, along and in the vicinity of the generatrix of the cylinder most remote from the exhaust valve or valves, the engine being equipped with means for starting the engine up and operating the engine at low power, wherein:

the exhaust valve or valves are so arranged as to allow flow on at least the major part of the periphery thereof;

the piston cooperates with a ceiling of the cylinder head so as to leave, in the vicinity of top dead center, only the required operational clearance between the piston and the part of the ceiling of the cylinder head in which the exhaust valve or valves is or are placed; and said recess is arranged to constitute practically alone the combustion chamber when the piston is in the vicinity of top dead center.

2. Engine according to claim 1 and further including a turbo-compressor unit for supercharging which has a turbine driven by the exhaust gas.

3. Engine according to claim 1, and further including a squish surface between the piston and a part of the ceiling of the cylinder head outside the recess which represents between about one half and three quarters of the transverse surface of the piston.

4. Engine according to claim 1, wherein said angle between the axis of the or each inlet valve and the axis of the cylinder is equal to about 40°.

5. Engine according to claim 1, wherein a relative rise of the or each inlet valve is approximately twice that of the or each exhaust valve.

6. Engine according to claim 1, wherein there is a single exhaust valve, whose longitudinal axis is preferably parallel to the axis of the cylinder or slightly inclined relative thereto, and two inlet valves placed at an inner end of a single partly cylindrical recess.

7. Engine according to claim 1, and further including, in a part of the ceiling of the cylinder head which is outside the recess, at least one groove whose cross-section and/or depth diminishes as one moves away from the recess.

* * * * *